United States Patent
Weh et al.

(10) Patent No.: US 10,053,073 B2
(45) Date of Patent: Aug. 21, 2018

(54) DRIVER BRAKE FORCE SIMULATOR FOR A BRAKING SYSTEM OF A VEHICLE, AND MANUFACTURING METHOD FOR A DRIVER BRAKE FORCE SIMULATOR

(71) Applicant: Robert Bosch GmbH, Stuttgart (DE)

(72) Inventors: Andreas Weh, Sulzberg (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 142 days.

(21) Appl. No.: 14/814,784

(22) Filed: Jul. 31, 2015

(65) Prior Publication Data
US 2016/0031424 A1    Feb. 4, 2016

(30) Foreign Application Priority Data
Jul. 31, 2014   (DE) .................. 10 2014 215 076

(51) Int. Cl.
*B60T 8/40*    (2006.01)

(52) U.S. Cl.
CPC .................. *B60T 8/409* (2013.01)

(58) Field of Classification Search
CPC ...... B60T 8/409; B60T 8/4081; B60T 8/4077; B60T 8/4086
See application file for complete search history.

(56) References Cited

U.S. PATENT DOCUMENTS

| | | | | |
|---|---|---|---|---|
| 2,708,110 A | * | 5/1955 | Clay | F16F 1/32 267/162 |
| 4,799,048 A | * | 1/1989 | Goshima | F15B 1/04 138/31 |
| 5,704,273 A | * | 1/1998 | Reeder | B60T 17/085 188/170 |
| 6,672,685 B2 | * | 1/2004 | Ishimura | B60T 7/042 303/113.4 |

(Continued)

FOREIGN PATENT DOCUMENTS

| | | |
|---|---|---|
| DE | 102011085986 | 7/2012 |
| JP | 06211124 A  * | 8/1994 |

OTHER PUBLICATIONS

JPH06211124 A machine translation from espacenet. 1994.*

*Primary Examiner* — F. Daniel Lopez
*Assistant Examiner* — Michael Quandt
(74) *Attorney, Agent, or Firm* — Norton Rose Fulbright US LLP; Gerard Messina

(57) ABSTRACT

A driver brake force simulator is provided for a braking system of a vehicle, including at least one spring, and a displaceable piston which delimits a pressure chamber formed in the driver brake force simulator and which is movable from its starting position, against an elastic force of the at least one spring, by a predefined maximum displacement travel in a first direction in such a way that a volume of the pressure chamber which is fillable with brake fluid is increasable. The driver brake force simulator includes at least multiple disk springs as the at least one spring. More- (Continued)

over, a manufacturing method is provided for a driver brake force simulator for a braking system of a vehicle by supporting a displaceable piston of the driver brake force simulator with the aid of at least one spring. The displaceable piston is supported by at least multiple disk springs as the at least one spring.

24 Claims, 11 Drawing Sheets

(56) References Cited

U.S. PATENT DOCUMENTS

| | | | | |
|---|---|---|---|---|
| 2008/0223670 A1* | 9/2008 | Toyohira | ................ | B60T 7/042 |
| | | | | 188/152 |
| 2012/0103452 A1* | 5/2012 | Toyohira | ................ | B60T 7/042 |
| | | | | 138/31 |
| 2013/0062934 A1* | 3/2013 | Daher | ................ | B60T 15/028 |
| | | | | 303/10 |

* cited by examiner

//DRIVER BRAKE FORCE SIMULATOR FOR A BRAKING SYSTEM OF A VEHICLE, AND MANUFACTURING METHOD FOR A DRIVER BRAKE FORCE SIMULATOR

FIELD OF THE INVENTION

The present invention relates to a driver brake force simulator for a braking system of a vehicle, and a braking system for a vehicle which includes at least one driver brake force simulator. Moreover, the present invention relates to a manufacturing method for a driver brake force simulator for a braking system of a vehicle.

BACKGROUND INFORMATION

A braking system for a vehicle is described in German Published Patent Application No. 10 2011 085 986. The braking system includes a master brake cylinder and a simulation device which is hydraulically connected to the master brake cylinder. The simulation device includes a displaceable piston which is movable from its starting position, against an elastic force of a spring of the simulation device, in such a way that a volume of a pressure chamber of the simulation device which is fillable with brake fluid is increasable.

SUMMARY

The present invention provides a driver brake force simulator for a braking system of a vehicle, a braking system for a vehicle, and a manufacturing method for a driver brake force simulator for a braking system of a vehicle.

The present invention provides driver brake force simulators which due to their being equipped with multiple disk springs convey to a user an advantageous (standard) brake actuation feel/pedal feel, and which at the same time require comparatively little installation space. The provided reduction in the required installation space of the driver brake force simulators according to the present invention compared to the related art simplifies integration of at least one driver brake force simulator according to the present invention into a hydraulic block/a hydraulic unit. At the same time, the present invention offers a cost-effective approach for equipping a braking system with at least one driver brake force simulator, making use of the ease of manufacturing disk springs. As discussed in greater detail below, in a driver brake force simulator which includes multiple disk springs, it is also possible to easily provide simulation characteristic curves (force-displacement curves) having a progressive curve. The present invention thus also contributes to increased comfort for a driver while using a brake actuating element (brake pedal) of his/her vehicle for inputting braking intent.

In one advantageous specific embodiment, the driver brake force simulator includes as disk springs at least one first disk spring having a first spring stiffness characteristic curve and at least one second disk spring having a second spring stiffness characteristic curve which differs from the first spring stiffness characteristic curve. The differing spring stiffness characteristic curves of the disk springs may be easily provided by different thicknesses and/or shapes of the disk springs. As discussed in greater detail below, a progressive curve of at least one simulation characteristic curve of the driver brake force simulator may be ensured in particular by implementing the at least two different spring stiffness characteristic curves of the disk springs.

The disk springs are preferably situated on a disk spring pin in such a way that a center longitudinal axis of the disk spring pin extends centrally through the disk springs. The disk springs may thus be easily arranged in series.

In another advantageous specific embodiment, the driver brake force simulator also includes, in addition to the disk springs, at least one further spring as the at least one spring, the at least one further spring assisting in supporting the displaceable piston in such a way that from its starting position, the displaceable piston, with a deformation of at least one further spring, is movable by a partial travel of the maximum displacement travel in the first direction, into an intermediate position in which the disk springs are still in their starting shapes, and the displaceable piston, with a deformation of the disk springs, is subsequently movable by a remaining travel of the maximum displacement travel in the first direction. In this case, equipping the driver brake force simulator with the at least one further spring cost-effectively provides a "jump-in area" on the simulation characteristic curve (force-displacement characteristic curve) of the driver brake force simulator.

For example, the driver brake force simulator may include at least one coil spring as the at least one further spring. As discussed in greater detail below, it is possible to equip the driver brake force simulator with the coil spring in addition to the disk springs without an appreciable increase in the installation space requirements of the driver brake force simulator.

In particular, at least some of the disk springs may be situated in an inner volume spanned by the coil spring. In this case, the installation space requirements of the driver brake force simulator remain (virtually) the same, despite its being equipped with the additional coil spring.

In one advantageous specific embodiment, the coil spring is supported on a first side on the displaceable piston, and on an oppositely situated second side is supported on a displaceable disk situated on the disk spring pin. It is thus possible to ensure that virtually no counterforce initially acts against a brake application into the driver brake force simulator.

In one alternative advantageous specific embodiment, the driver brake force simulator may include a guide plate whose base surface is situated between the displaceable piston and one disk spring of the disk springs which is nearest to the pressure chamber, and whose at least one side wall extends along some of the disk springs, the coil spring being supported on the first side on the displaceable piston, and on the oppositely situated second side being supported on a flange of the guide plate. This also ensures the advantage described in the preceding paragraph.

The above-described advantages are also ensured in a braking system for a vehicle which includes at least one driver brake force simulator of this type.

In addition, carrying out the corresponding manufacturing method for a driver brake force simulator for a braking system of a vehicle provides the above-described advantages. The manufacturing method may be refined according to the specific embodiments of the driver brake force simulator explained above.

DETAILED DESCRIPTION

FIGS. 1a through 1d show schematic illustrations of a first specific embodiment of the driver brake force simulator.

Figure 1A:
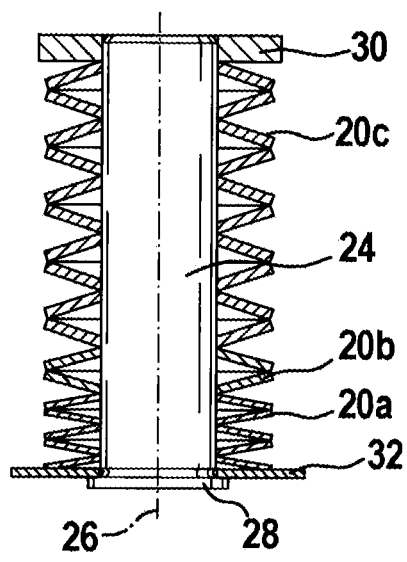
FIGS. 1a through 1d show schematic illustrations of a first specific embodiment of the driver brake force simulator.
Figure 1B:
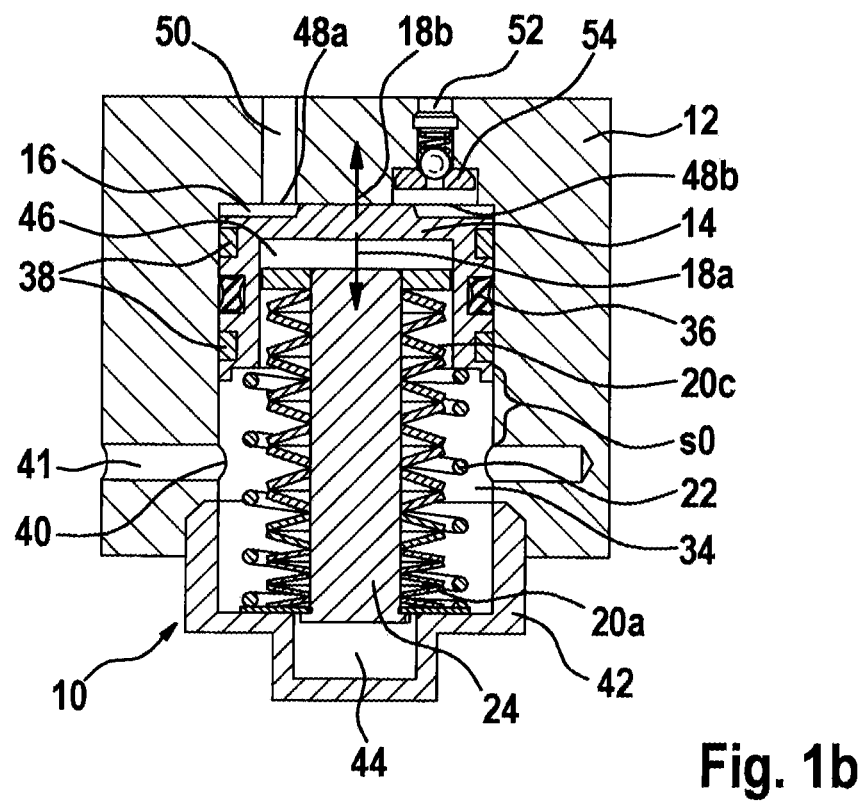
Figure 1C:
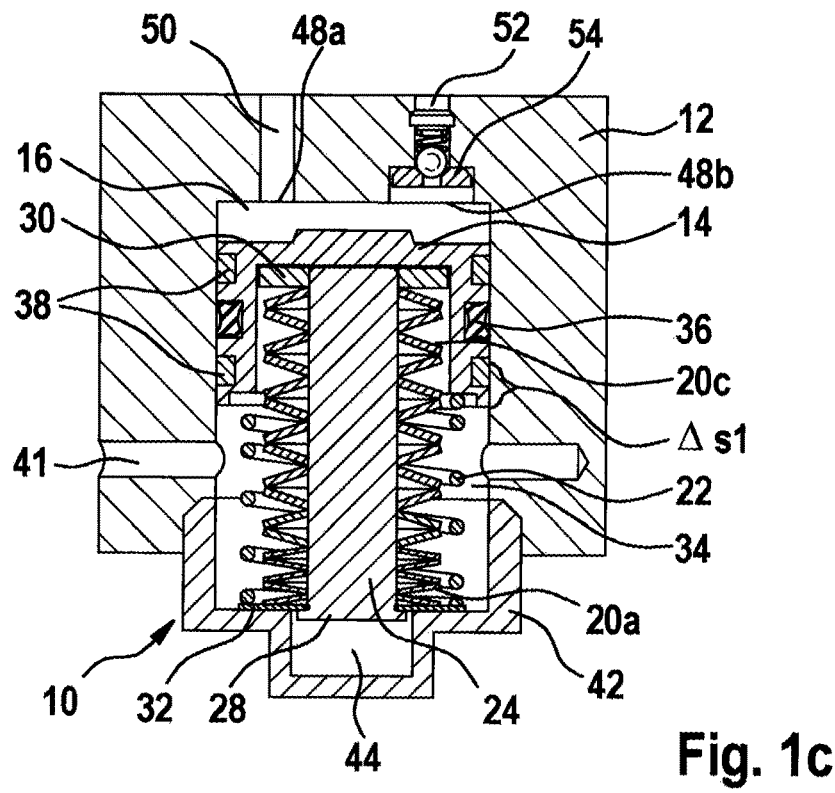
Figure 1D:
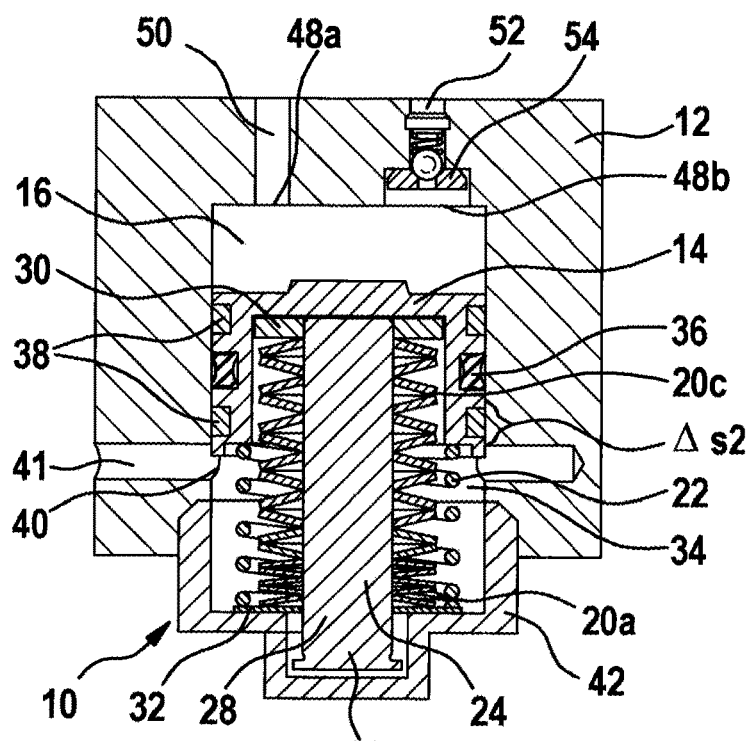

Driver brake force simulator 10 schematically illustrated (at least partially) in FIGS. 1a through 1d is usable in a braking system of a vehicle/motor vehicle. For example, driver brake force simulator 10 (without its own housing) may be integrated into a hydraulic unit/a hydraulic block 12 of the braking system, as illustrated in FIGS. 1b through 1d. However, as an alternative, driver brake force simulator 10 may also be installed/installable in the braking system as an independent compact component (with its own housing). It is pointed out that the usability of driver brake force simulator 10 is not limited to a specific type of braking system or to a specific type of vehicle/motor vehicle.

Driver brake force simulator 10 includes a displaceable piston 14 which delimits a pressure chamber 16 provided in driver brake force simulator 10. Displaceable piston 14 is movable from its starting position by a predefined maximum displacement travel s0 in a first direction 18a in such a way that a volume of pressure chamber 16 which is fillable with brake fluid is increasable (compare FIGS. 1b through 1d). Correspondingly, displaceable piston 14 may also be movable in a second direction 18b, opposite to first direction 18a, in such a way that the volume of pressure chamber 16 which is fillable with brake fluid is reducible. An elastic force of at least one spring 20a through 20c and 22 of driver brake force simulator 10 acts against a displacement movement of displaceable piston 14 from its starting position by predefined maximum displacement travel s0 in first direction 18a, driver brake force simulator 10 including at least multiple disk springs 20a through 20c as the at least one spring 20a through 20c and 22.

The starting position may be understood to mean a position of displaceable piston 14 in which displaceable piston 14 is held with the aid of the elastic force of the at least one spring 20a through 20c and 22 of driver brake force simulator 10, provided that no pressure force is exerted on displaceable piston 14. In particular, provided that no brake fluid volume is pressed into pressure chamber 16, displaceable piston 14 is in its (powerless) starting position. The shapes of (possibly pretensioned) disk springs 20a through 20c when displaceable piston 14 is in its starting position may be referred to as (pretensioned) starting shapes.

Disk springs 20a through 20c are inexpensively manufacturable, and are usable over a relatively long operating period with negligibly low risk of damage to the simulation. The elastic force which is effectuatable at least with the aid of disk springs 20a through 20c, and which counteracts the displacement movement of displaceable piston 14 along maximum displacement travel s0 in first direction 18a, may therefore be significant, at least in sections, even for a relatively small design of disk springs 20a through 20c. Driver brake force simulator 10 which is equipped with disk springs 20a through 20c is therefore designable with comparatively small installation space requirements. This simplifies in particular integration of driver brake force simulator 10 into hydraulic unit 12. In addition, the installation of a driver brake force simulator 10, including disk springs 20a through 20c, which is designed as an individual component, in a vehicle's own braking system is simplified.

As is apparent from the enlarged partial illustration of driver brake force simulator 10 in FIG. 1a, driver brake force simulator 10 described here includes as disk springs 20a through 20c at least one first disk spring 20a having a first spring stiffness characteristic curve, and at least one second disk spring 20b having a second spring stiffness characteristic curve which differs from the first spring stiffness characteristic curve. In particular, driver brake force simulator 10 includes multiple first disk springs 20a, multiple second disk springs 20b, and multiple third disk springs 20c, third disk springs 20c having a third spring stiffness characteristic curve which differs from the first spring stiffness characteristic curve and the second spring stiffness characteristic curve. The spring stiffness characteristic curves of disk springs 20a through 20c are established in such a way that moving displaceable piston 14 from its starting position in first direction 18a takes place initially with a deformation of first disk springs 20a, then with a deformation of second disk springs 20b, and lastly with a deformation of third disk springs 20c. As described in greater detail below, this results in a progressive curve of the elastic force which is achieved at least with the aid of disk springs 20a through 20c, which, at least in sections, acts against the displacement of displaceable piston 14 from its starting position along maximum displacement travel s0 in first direction 18a.

In the illustrated specific embodiment, disk springs 20a through 20c are situated on a disk spring pin 24 (or a sleeve) in such a way that a center longitudinal axis 26 of disk spring pin 24 extends centrally through disk springs 20a through 20c. Disk springs 20a through 20c situated on disk spring pin 24 thus form a disk spring assembly. This may also be described in that disk springs 20a through 20c are directly stacked one on top of the other on disk spring pin 24. Disk spring pin 24 may be hardened. The stack of disk springs 20a through 20c is designable in such a way that its influence on the friction is negligible. Detachment of disk springs 20a through 20c from disk spring pin 24 (guide pin) on a first side of disk spring pins 24 is preventable with the aid of a form-fit head 28 of disk spring pin 24 (or a collar stamped on the sleeve), and on an oppositely situated second side of disk spring pin 24 is preventable with the aid of a disk 30 which is pressed onto disk spring pin 24 (or the sleeve). Disk springs 20a through 20c situated on disk spring pin 24 thus form a compact subassembly (assembly unit) which is easily mountable/installable in driver brake force simulator 10. Prior to insertion into the driver brake force simulator, the subassembly may be checked and/or assembled (with regard to a characteristic curve desired by a customer).

In addition, a movable disk 32 may also be situated between disk spring 20a, which is farthest from pressure chamber 16, and form-fit head 28 of disk spring pin 24. The advantageous function of movable disk 32 will be discussed in greater detail below.

As is apparent in FIGS. 1b through 1c, at least disk springs 20a through 20c of driver brake force simulator 10 may be situated in a spring chamber 34 which is sealed off from pressure chamber 16 in a fluid-tight manner with the aid of at least one sealing element 36, such as a lip seal 36, which is inserted into displaceable piston 14. Optionally, at least one guide ring 38 may also be inserted on displaceable piston 14. Spring chamber 34 is preferably connected/connectable to a brake fluid reservoir of the particular braking system via a volume compensation opening 40 (and a suction line 41 opening into same). Spring chamber 34 is easily mountable in hydraulic unit 12 by fastening a closure cover 42 to hydraulic unit 12 on the side of the hydraulic unit facing away from displaceable piston 14.

As an optional refinement, driver brake force simulator 10 also includes, in addition to disk springs 20a through 20c, at least one further spring 22. The at least one further spring 22 assists in supporting displaceable piston 14 (together with disk springs 20a through 20c) in such a way that displaceable piston 14 is movable from its starting position, illustrated in FIG. 1b, with a deformation (solely) of the at least one further spring 22, by a partial travel Δs1 of maximum displacement travel s0 in first direction 18a, into an intermediate position. FIG. 1c shows displaceable piston 14 in its intermediate position in which disk springs 20a through 20c are still in their (possibly pretensioned) starting shapes. Displaceable piston 14 is subsequently further displaceable (from the intermediate position), with a deformation of disk springs 20a through 20c (from their possibly pretensioned starting shapes), by a remaining travel Δs2 of maximum displacement travel s0 in first direction 18a (see FIG. 1d).

A spring stiffness of the at least one further spring 22 is preferably small enough that, during the displacement of displaceable piston 14 from its starting position by partial travel Δs1 in first direction 18a, the oppositely acting elastic force is negligible. A jump-in area may thus be achieved on a simulation characteristic curve of driver brake force simulator 10 by equipping driver brake force simulator 10 with the at least one further spring 22.

Driver brake force simulator 10 may include at least one coil spring 22 as the at least one further spring 22. Upon completion of a braking operation by the driver (by overcoming adhesion and/or a friction force of the at least one sealing element 36), displaceable piston 14 is pressable back into its starting position, illustrated in FIG. 1b, with the aid of coil spring 22. A cost-effective spring type for achieving the (virtually) powerless jump-in area on the simulation characteristic curve of driver brake force simulator 10 may thus be utilized. Coil spring 22 is advantageously situated in driver brake force simulator 10 in such a way that at least some of disk springs 20a through 20d are situated in an inner volume spanned by coil spring 22. Equipping driver brake force simulator 10 with coil spring 22 is thus achievable without a (significant) increase in the installation space requirements of driver brake force simulator 10. However, the design of the jump-in area is not limited to the use of coil spring 22.

In the specific embodiment in FIGS. 1a through 1b, coil spring 22 is supported on a first side on displaceable piston 14. Coil spring 22 is supported on a second side, opposite from the first side, on displaceable disk 32, a side of displaceable disk 32 facing away from coil spring 22 contacting closure cover 42 at a contact surface. As an advantageous refinement, a recess 44 is formed on closure cover 42 which is enclosed by the contact surface, and into which form-fit head 28 of disk spring pin 24 at least partially protrudes. As long as disk springs 20a through 20c remain in their (possibly pretensioned) starting shapes, a maximum distance is present between fastening ring 30 and displaceable disk 32, thus preventing further displacement of form-fit head 28 of disk spring pin 24 into recess 44. In addition, the disk spring assembly and coil spring 22 are pretensionable with the aid of movable disk 32 in such a way that a gap 46 is still present between fastening disk 30 and displaceable piston 14 when displaceable piston 14 is in its starting position.

When a brake fluid volume (from a master brake cylinder, not illustrated, of the particular braking system) is pressed into pressure chamber 16 via a hydraulic line 50 which opens into a first opening 48a of pressure chamber 16 with the aid of a driver braking force, displaceable piston 14 is initially displaced, with a deformation solely of the at least one further spring 22/coil spring 22, by partial travel Δs1 of maximum displacement travel s0 from its starting position into its intermediate position in first direction 18a. The displacement of displaceable piston 14 by partial travel Δs1 in first direction 18a therefore effectuates only closing of gap 46, previously present between fastening disk 30 and displaceable piston 14 (see FIG. 1c). During the displacement of displaceable piston 14 from its starting position by partial travel Δs1 in first direction 18a, disk springs 20a through 20c remain in their (possibly pretensioned) starting shapes. The maximum distance thus continues to be present between fastening ring 30 and displacement disk 32, thus preventing further displacement of form-fit head 28 of disk spring pin 24 into recess 44.

Disk springs 20a through 20c are not compressed until displaceable piston 14 is further displaced from its intermediate position, illustrated in FIG. 1c, by remaining travel Δs2 of maximum displacement travel s0 in first direction 18a, thus reducing the distance between fastening disk 30 and displaceable disk 32. Form-fit head 28 of disk spring pin 24 is therefore pressed into recess 44 in closure cover 42 during the further displacement of displaceable piston 14 from its intermediate position by remaining travel Δs2 in first direction 18a. A maximum displacement depth of form-fit head 28 of disk spring pin 24 into recess 44 may be set in such a way that form-fit head 28 already strikes closure cover 42 before disk springs 20a through 20c are completely compressed. This provides additional protection of disk springs 20a through 20c during operation of driver brake force simulator 10.

As an optional refinement, driver brake force simulator 10 schematically illustrated in FIGS. 1a through 1d also includes a second opening 48b at pressure chamber 16. A further line 52 including a check valve 54 (in parallel to line 50) may advantageously extend from second opening 48b to the master brake cylinder. Occurrence of overpressure in pressure chamber 16 is thus reliably preventable.

Figure 2A:
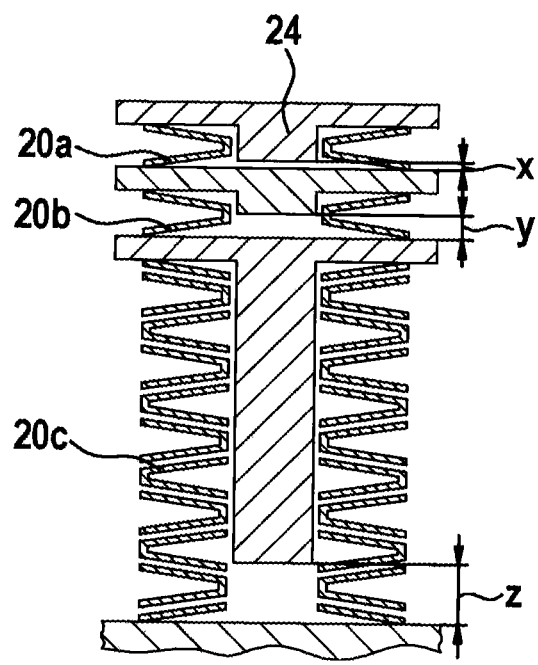
FIGS. 2a and 2b respectively show a schematic partial illustration of a second specific embodiment of the driver brake force simulator and a coordinate system for explaining its mode of operation.
Figure 2B:
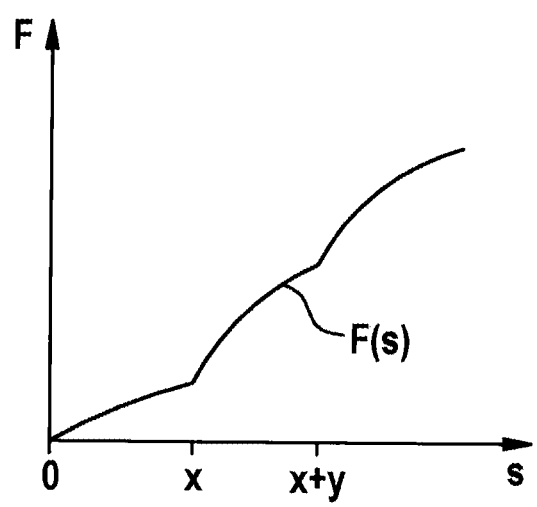

FIGS. 2a and 2b respectively show a schematic partial illustration of a second specific embodiment of the driver brake force simulator and a coordinate system for explaining its mode of operation.

Driver brake force simulator 10, only partially illustrated in FIG. 2a, includes multiple disk springs 20a through 20c, first disk springs 20a which have the first spring stiffness characteristic curve being combined on disk spring pin 24 to form a first disk spring subassembly, second disk springs 20b which have the second spring stiffness characteristic curve being combined on disk spring pin 24 to form a second disk spring subassembly, and third disk springs 20c which have the third spring stiffness characteristic curve being combined on disk spring pin 24 to form a third disk spring subassembly. A stack of the various disk spring subassemblies in series is achieved on disk spring pin 24. In addition, disk spring pin 24 together with the disk spring subassemblies fastened thereto, schematically depicted in FIG. 2a, is easily mountable in a hydraulic unit 12 and/or a (dedicated) housing of driver brake force simulator 10, as will be explained in greater detail below.

Each disk spring subassembly of disk springs 20a, 20b, or 20c (of the same disk spring type) has a specific force-displacement characteristic curve. The force-displacement characteristic curve of the particular disk spring subassembly is establishable, for example, via the number of stacked disk springs 20a, 20b, or 20c of the particular disk spring subassembly, a stack of disk springs 20a, 20b, or 20c of the particular disk spring subassembly, a material composition of disk springs 20a, 20b, or 20c of the particular disk spring subassembly, a shape of disk springs 20a, 20b, or 20c of the particular disk spring subassembly, and (for a multistacked disk spring subassembly) a coefficient of friction of the particular disk springs 20a, 20b, or 20c. An arbitrary number of different force-displacement characteristic curves may thus be implemented for the disk spring subassemblies of driver brake force simulator 10. The design of driver brake force simulator 10 is also not limited to a specific number of different disk spring subassemblies. Instead, the number of disk spring assemblies of driver brake force simulator 10 may be selected with a high level of design freedom with regard to the desired simulation characteristic curve F(s) (in particular on a progressive simulation characteristic curve F(s)).

In addition, for each of the disk spring subassemblies a lift limit is established in such a way that the first disk spring subassembly situated on disk spring pin 24 is maximally compressible by a first difference x, the second disk spring subassembly situated on disk spring pin 24 is maximally compressible by a second difference y, and the third disk spring subassembly situated on disk spring pin 24 is maximally compressible by a third difference z (in succession). With the aid of the lift limit (and possibly a pretensioning of the various disk spring subassemblies situated on disk spring pin 24), advantageous subareas of the force-displacement characteristic curves of the disk spring subassemblies may be selected in a targeted manner for establishing the desired simulation characteristic curve F(s) of driver brake force simulator 10.

In the coordinate system in FIG. 2b, an abscissa denotes a displacement travel s of displaceable piston 14 of driver brake force simulator 10 from its starting position or from its intermediate position. An ordinate of the coordinate system in FIG. 2b indicates an elastic force F which acts against the (partial) compression of disk springs 20a through 20c.

For displacing displaceable piston 14 from its starting position, or, after overcoming the jump-in area, from its intermediate position, for a displacement travel s between zero and x, initially (softest) first disk springs 20a of the first disk spring subassembly are compressed. For a displacement travel s between zero and x, the curve of simulation characteristic curve F(s) of driver brake force simulator 10 therefore corresponds to the force-displacement characteristic curve of the first disk spring subassembly. For a displacement travel s=x, further compression of first disk springs 20a of the first disk spring subassembly is prevented by closing a first stop of disk spring pin 24. Instead, a compression of second disk springs 20b of the second disk spring subassembly, which has a greater stiffness than the first disk spring subassembly, takes place between an actuating travel s between x and x+y. Beginning with displacement travel s=x, an increase in simulation characteristic curve F(s) of driver brake force simulator 10 therefore grows significantly larger. For a displacement travel s=x+y, further compression of second disk springs 20b of the second disk spring subassembly is also prevented by closing a second stop of disk spring pin 24. For a displacement travel s between x+y and x+y+z, (stiffest) third disk springs 20c of the third disk spring subassembly are therefore compressed. Also beginning with displacement travel s=x+y, the increase in the simulation characteristic curve F(s) of driver brake force simulator 10 thus grows significantly larger.

As is apparent with reference to the coordinate system in FIG. 2b, resulting simulation characteristic curve F(s) of driver brake force simulator 10 in FIG. 2a has the desired progressive curve. Driver brake force simulator 10 thus already effectuates a comparatively large counterforce/elastic force F with a comparatively small displacement travel s of its displaceable piston 14.

FIGS. 3a through 3d show schematic illustrations of a third specific embodiment of the driver brake force simulator.

Driver brake force simulator 10 schematically depicted in FIGS. 3a through 3d includes multiple disk spring assemblies (each made up of disk springs 20a through 20c) situated on a disk spring pin 24.

In addition, driver brake force simulator 10 is equipped with coil spring 22 as an example of the at least one further spring 22 for achieving a jump-in area.

In the specific embodiment in FIGS. 3a through 3d, driver brake force simulator 10 also includes a guide plate 60 whose base surface is situated between displaceable piston 14 and a disk spring 20c of disk springs 20a through 20c which is nearest to pressure chamber 16. At least one side wall of guide plate 60 extends along some of disk springs 20a through 20c. For example, a cylindrical side wall of guide plate 60 may extend along some of disk springs 20a through 20c. Coil spring 22 is supported on the first side on displaceable piston 14, and on the oppositely situated second side is supported on a flange 62 of guide plate 60. Guide plate 60 is thus usable for pretensioning disk springs 20a through 20c and coil spring 22.

Figure 3A:
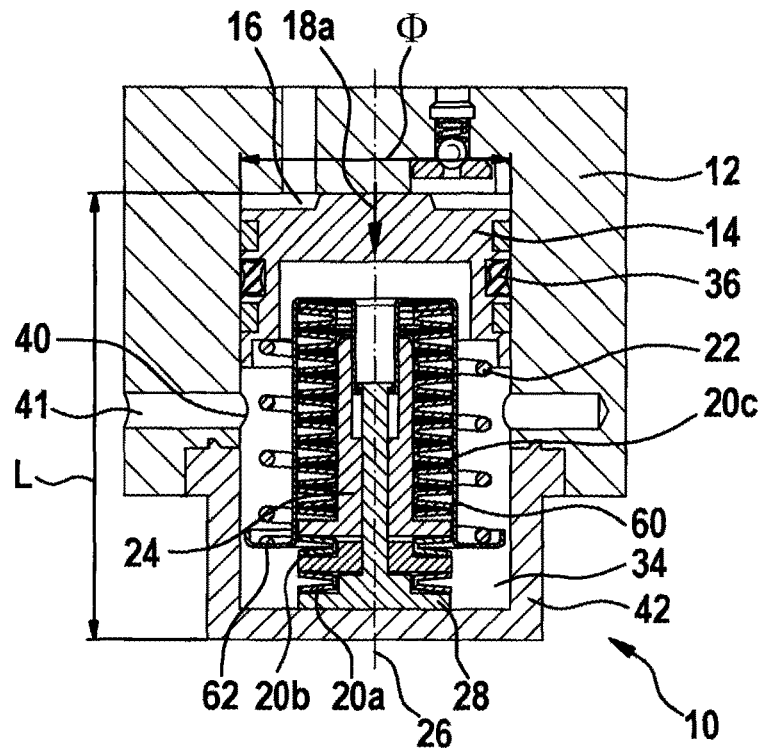
FIGS. 3a through 3d show schematic illustrations of a third specific embodiment of the driver brake force simulator.

It is pointed out that driver brake force simulator 10 depicted in FIG. 3a may have a longitudinal extension L less than 40 mm (directed in parallel to first direction 18a and second direction 18b). Driver brake force simulator 10 preferably has a longitudinal extension L less than 38 mm, in particular less than or equal to 35 mm. A diameter Φ of driver brake force simulator 10 (directed perpendicularly with respect to longitudinal extension L) may be less than 30 mm. Driver brake force simulator 10 preferably has a diameter Φ less than 28 mm, in particular less than or equal to 25 mm. As discussed in greater detail below, even such a small driver brake force simulator 10 is easily and cost-effectively manufacturable. An installation space necessary for providing/mounting driver brake force simulator 10 is thus relatively small.

Figure 3B:
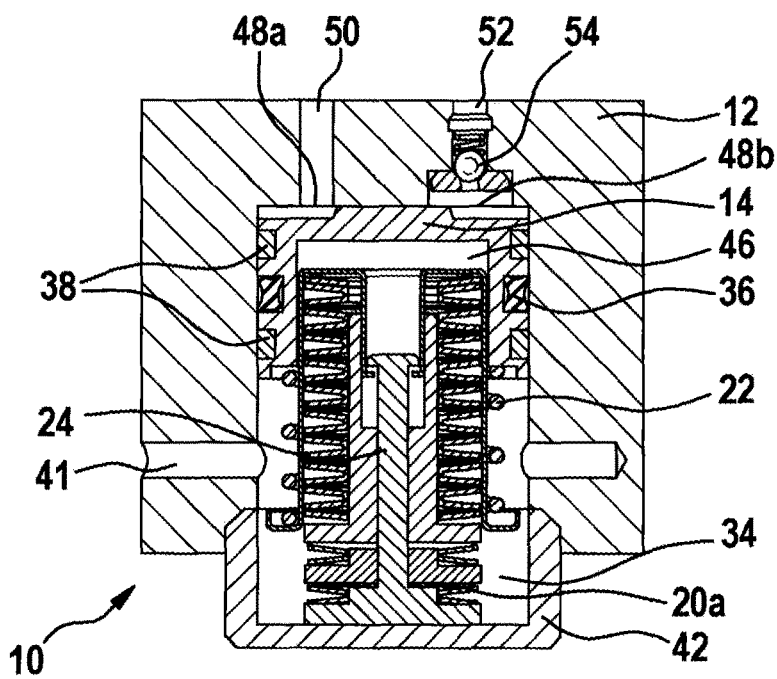

FIG. 3b shows driver brake force simulator 10 when displaceable piston 14 is in its (powerless) starting position. In such a situation, the driver braking force transmitted to driver brake force simulator 10 is generally equal to zero.

Figure 3C:
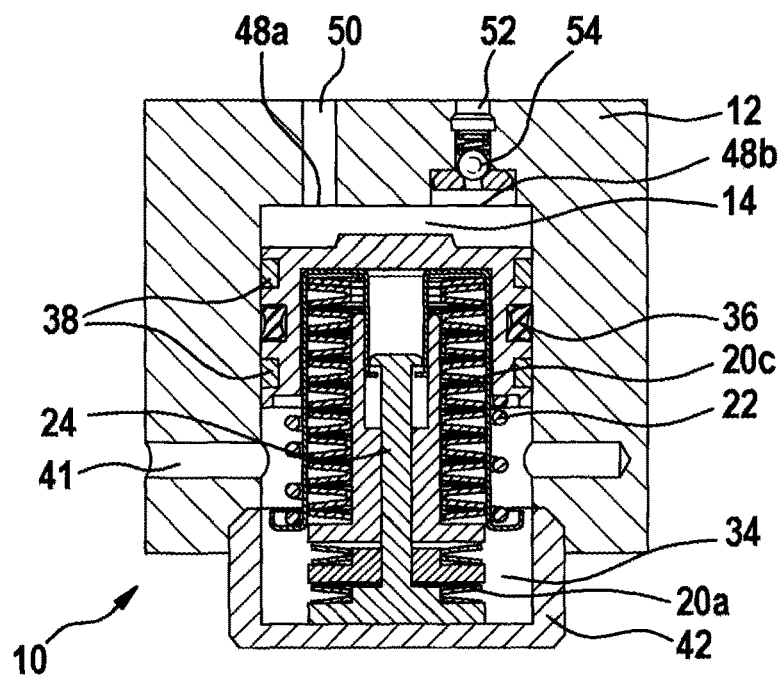

FIG. 3c illustrates driver brake force simulator 10 after overcoming the provided jump-in area. Only gap 46 between base surface of guide plate 60 and displaceable piston 14 is closed by a compression of coil spring 22. However, disk springs 20a through 20c continue to be in their (pretensioned) starting shapes.

Figure 3D:
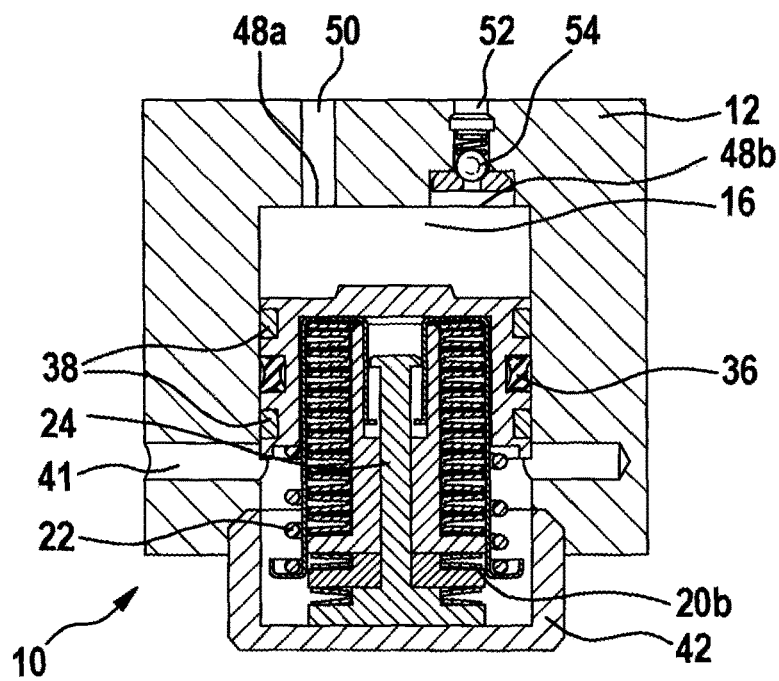

FIG. 3d shows piston 14 displaced from its starting position by maximum displacement travel s0. As is apparent in FIG. 3d, also in the specific embodiment in FIGS. 3a through 3d, via a suitable depth of closure cover 42 the displacement of displaceable piston 14 may already be stopped before all disk springs 20a through 20c are completely compressed.

Figure 4:
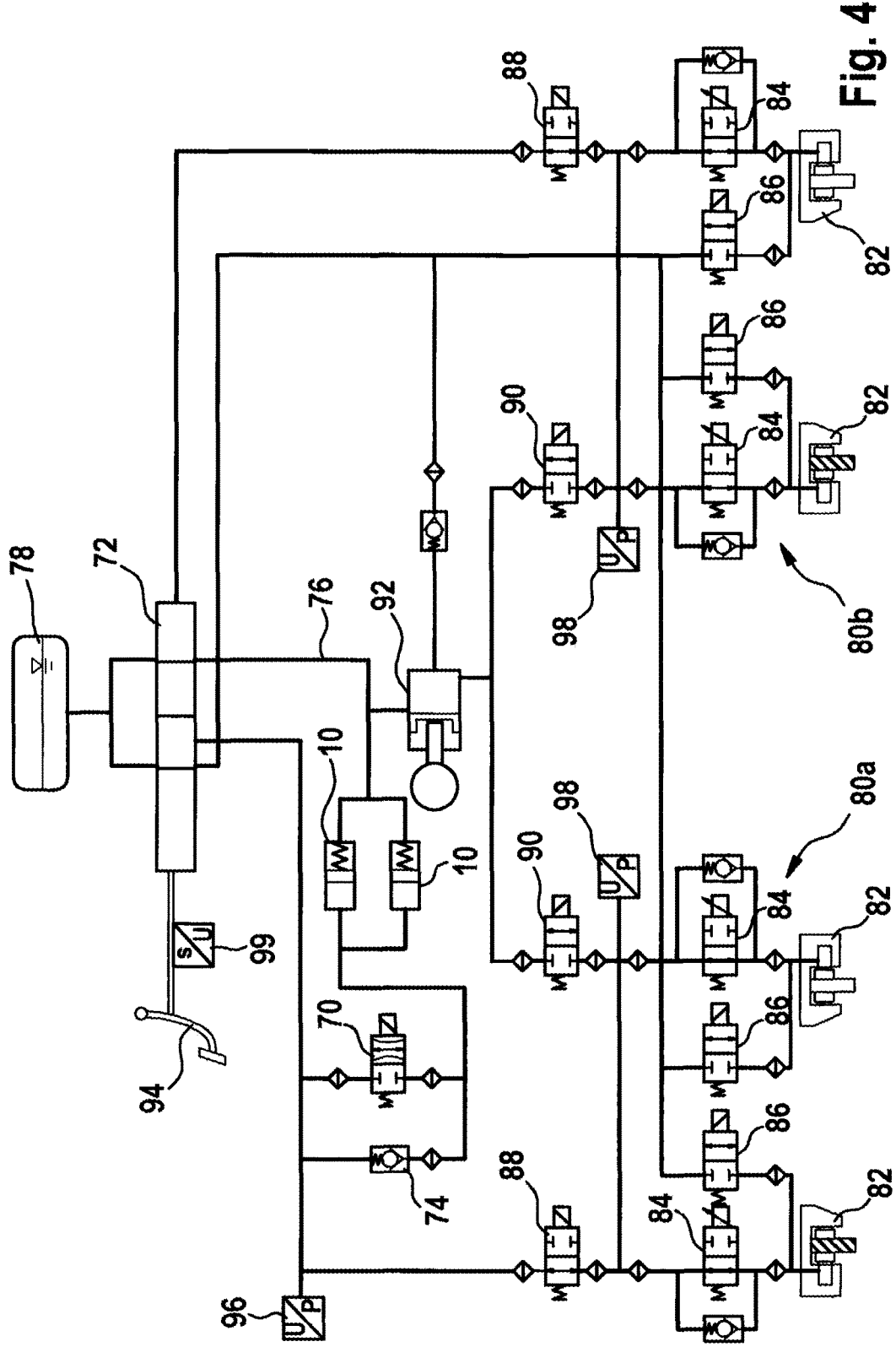
FIG. 4 shows a schematic illustration of one specific embodiment of the braking system.

FIG. 4 shows a schematic illustration of one specific embodiment of the braking system.

The braking system schematically illustrated in FIG. 4 includes two driver brake force simulators 10 as an example, each including multiple disk springs 20a through 20c. The two driver brake force simulators 10 may optionally be connected to at least one pressure chamber of a master brake cylinder 72 via a simulator valve 70. Due to a parallel connection of multiple driver brake force simulators 10 to simulator valve 70/master brake cylinder 72, a length of the particular lift occurring at each driver brake force simulator 10 may be shortened during brake application into driver brake force simulators 10 by a driver. The number of driver brake force simulators 10 situated in parallel with one another may be freely selected. Equipping the braking system in FIG. 4 with exactly two driver brake force simulators 10 is understood to be merely an example.

In addition, as an alternative or as a supplement to electrically controllable simulator valve 70, the braking system may include a check valve 74 via which the at least one driver brake force simulator 10 is connected to master brake cylinder 72. The occurrence of overpressure in pressure chamber 16 of the at least one driver brake force simulator 10 is thus reliably preventable. Furthermore, spring chamber 34 of the at least one driver brake force simulator 10 may be connected to a brake fluid reservoir 78 of the braking system via at least one suction line 76.

The braking system in FIG. 4 includes two brake circuits 80a and 80b as an example. Each brake circuit 80a and 80b includes two wheel brake cylinders 82, with one wheel inlet valve 84 each per wheel brake cylinder 82 and with one wheel outlet valve 80 each per wheel brake cylinder 82. Each brake circuit 80a and 80b is connected to master brake cylinder 72 via one first shutoff valve 88 each. Wheel brake cylinders 82, wheel inlet valves 84, and wheel outlet valves 86 are therefore decoupleable from master brake cylinder 72 by closing the particular first shutoff valve 88. In addition, each brake circuit 80a and 80b is connected to motorized piston-cylinder device 92 (a plunger, for example) via one second shutoff valve 90 each. After the particular first shutoff valve 88 closes, the at least one brake pressure present in wheel brake cylinders 82 of the particular brake circuit 80a or 80b is thus also settable, independently of an actuation of a brake actuating element/brake pedal 94 connected to master brake cylinder 72, with the aid of motorized piston-cylinder device 92. Wheel outlet valves 86 and/or motorized piston-cylinder device 92 is/are preferably likewise connected to brake fluid reservoir 78. The at least one pressure chamber of master brake cylinder 72 may also be hydraulically connected to brake fluid reservoir 78, in particular via one balancing bore each. In addition, the braking system may also include least one pilot pressure sensor 96 and/or at least one pressure sensor 98. The braking system may also optionally be equipped with at least one brake actuation sensor 99, for example a pedal travel sensor and/or a rod travel sensor 99.

Upon a braking request by a driver of the vehicle equipped with the braking system by actuating brake actuating element/brake pedal 94, the driver's braking intent may also be met, after second shutoff valves 90 are opened, with the aid of motorized piston-cylinder device 92 (possibly in cooperation with a generator for recuperative braking, not illustrated). To ensure a standard brake actuation feel/pedal feel for the driver, the brake fluid volume pressed out from master brake cylinder 72 with the aid of the driver braking force (after first shutoff valves 88 close and simulator valve 70 opens) may be displaced into pressure chamber 16 of the at least one driver brake force simulator 10 of the braking system. During the displacement of the brake fluid volume into pressure chamber 16 of the at least one driver brake force simulator 10, springs 20a through 20c and 22 of the at least one driver brake force simulator 10 generate a resistance which advantageously corresponds to a resistance which typically occurs when the driver brakes wheel brake cylinders 82 of the braking system. In particular, the resistance generated when the brake fluid volume is displaced into pressure chamber 16 of the at least one driver brake force simulator 10 is a function of an actuating travel of brake actuating element/brake pedal 94 from its (powerless/unactuated) starting position.

FIGS. 5a through 5d show schematic illustrations for explaining a first specific embodiment of the manufacturing method for a driver brake force simulator for a braking system of a vehicle.

Driver brake force simulator 10 is mounted in a hydraulic unit 12 with the aid of the method steps described in greater detail below. However, as an alternative to hydraulic unit 12 having a borehole 100, at which, for example, a brake fluid exchange opening 40 for subsequent spring chamber 34 and/or a first opening 48a and a second opening 48b for subsequent pressure chamber 16 is/are formed, a (dedicated) housing of driver brake force simulator 10 may also be used for the method steps described below.

Figure 5A:
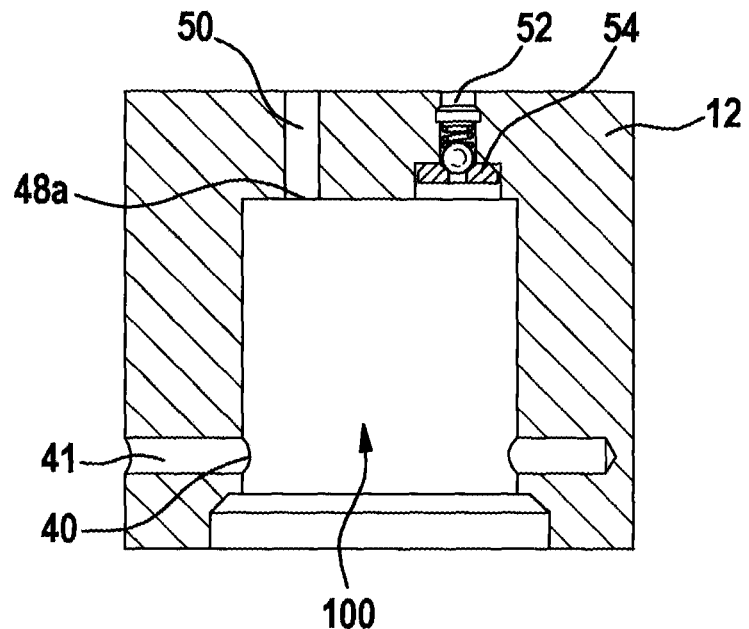
FIGS. 5a through 5d show schematic illustrations for explaining a first specific embodiment of the manufacturing method for a driver brake force simulator for a braking system of a vehicle.
Figure 5B:
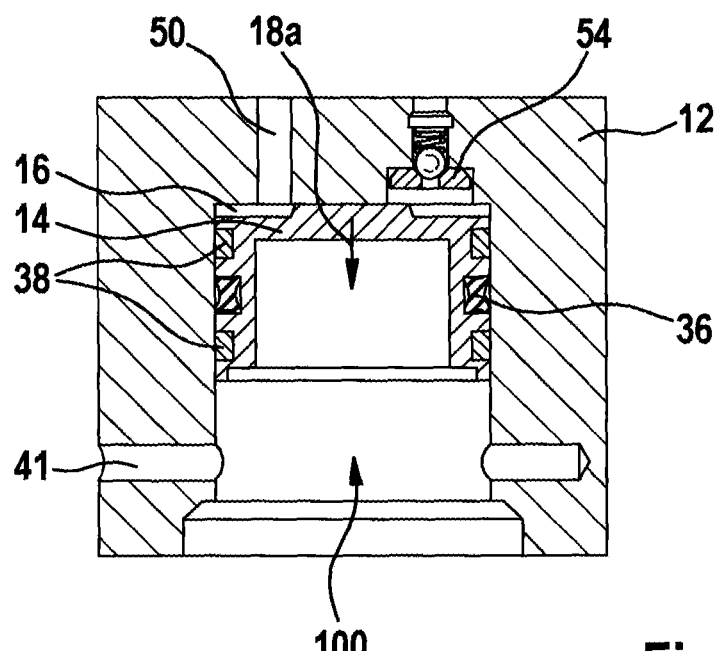

Optionally, a check valve 54 may be inserted into a widening of a line 52, opening at second opening 48b, via which borehole 100 is connectable to a (subsequent) master brake cylinder (see FIG. 5a). However, it is pointed out that during the manufacture of driver brake force simulator 10, connecting it to the master brake cylinder via check valve 54 is strictly optional. In addition, the connection of driver brake force simulator 10 to the (subsequent) master brake cylinder via a line 50 of hydraulic unit 12 which extends in parallel to line 52 and opens at first opening 48a is to be interpreted only as an example.

For manufacturing driver brake force simulator 10, a displaceable piston 14 of subsequent driver brake force simulator 10 is inserted into borehole 100. This takes place in such a way that displaceable piston 14 delimits a pressure chamber 16, formed in borehole 100/subsequent driver brake force simulator 10, in such a way that during subsequent operation of driver brake force simulator 10, a volume of pressure chamber 16 which is fillable with brake fluid is increased by moving displaceable piston 14 from its starting position by a predefined maximum displacement travel s0 in a first direction 18a. As outlined in FIG. 5b, displaceable piston 14 which is inserted into borehole 100 may already include at least one sealing element 36 (a lip seal 36, for example) fastened thereto and/or at least one guide ring 38.

Figure 5C:
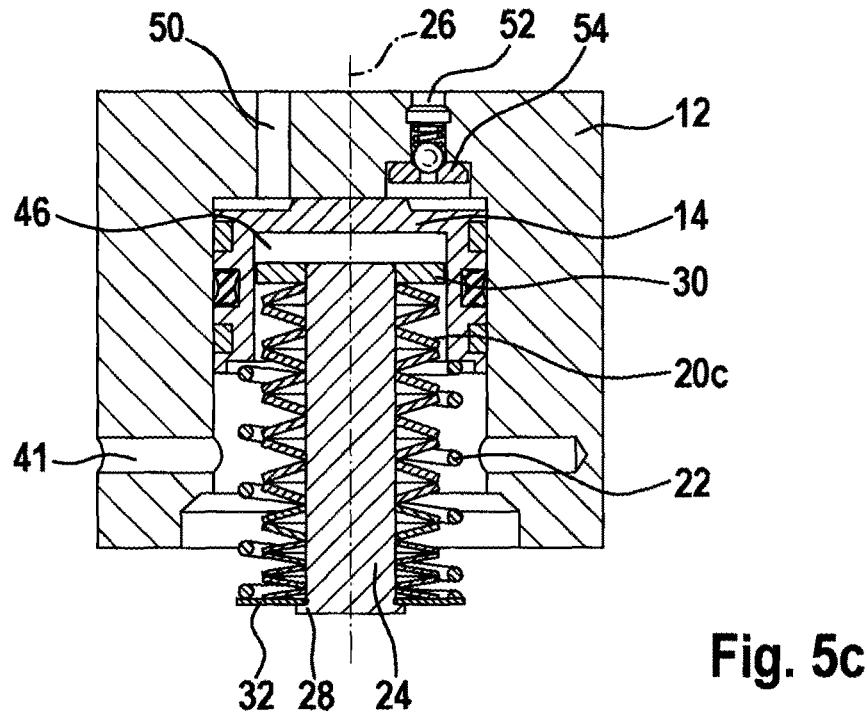

As shown in FIG. 5c, springs 20a through 20c and 22 of subsequent driver brake force simulator 10 are subsequently inserted into borehole 100 in such a way that an elastic force of springs 20a through 20c and 22 acts against a subsequent displacement of displaceable piston 14 in first direction 18a. In particular, displaceable piston 14 is supported at least with multiple disk springs 20a through 20c as the at least one spring 20a through 20c and 22.

Disk springs 20a through 20c are preferably situated beforehand on a disk spring pin 24 in such a way that a center longitudinal axis 26 of disk spring pin 24 extends centrally through disk springs 20a through 20c. A disk 30 may be pressed onto one end of disk spring pin 24 bearing disk springs 20a through 20c which faces away from a form-fit head 28 of disk spring pin 24. In particular, the disk may be pressed on in such a way that the disk springs are assembled on a predefined/customer-specific characteristic curve. (Optionally, a movable disk 32 may also be introduced beforehand between disk springs 20a through 20c and form-fit head 28 of disk spring pin 24.) Disk springs 20a through 20c fastened to a disk spring pin 24 may subsequently be easily introduced into borehole 100/subsequent driver brake force simulator 10 as a compact mounting part/a compact subassembly (assembly unit).

Optionally, displaceable piston 14 in addition to disk springs 20a through 20c may also be supported by at least one further spring 22 as the at least one spring 20a through 20c and 22 in such a way that during subsequent operation of driver brake force simulator 10, during a displacement of displaceable piston 14 from its starting position by a partial travel Δs1 of maximum displacement travel s0 in first direction 18a into an intermediate position, the at least one further spring 22 is deformed, while disk springs 20a through 20c which assist in supporting displaceable piston 14 in the intermediate position are still in their (possibly pretensioned) starting shapes. In this case, disk springs 20a through 20c are not deformed until during a subsequent displacement of displaceable piston 14 by a remaining travel Δs2 of maximum displacement travel s0 in first direction 18a. In the specific embodiment in FIGS. 5a through 5d, displaceable piston 14 is supported by a coil spring 22 as the at least one further spring 22. However, this is to be interpreted only as an example.

Figure 5D:
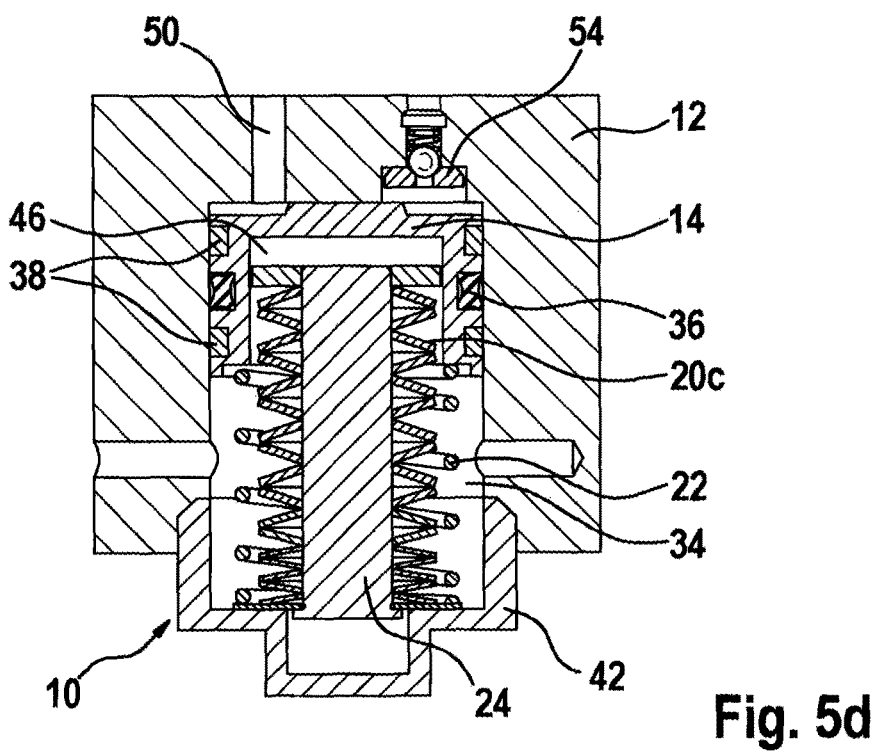

The borehole may be closed with the aid of a closure cover 42 in a concluding method step. This is illustrated in FIG. 5d.

FIGS. 6a through 6e show schematic illustrations for explaining a second specific embodiment of the manufacturing method for a driver brake force simulator for a braking system of a vehicle.

Figure 6A:
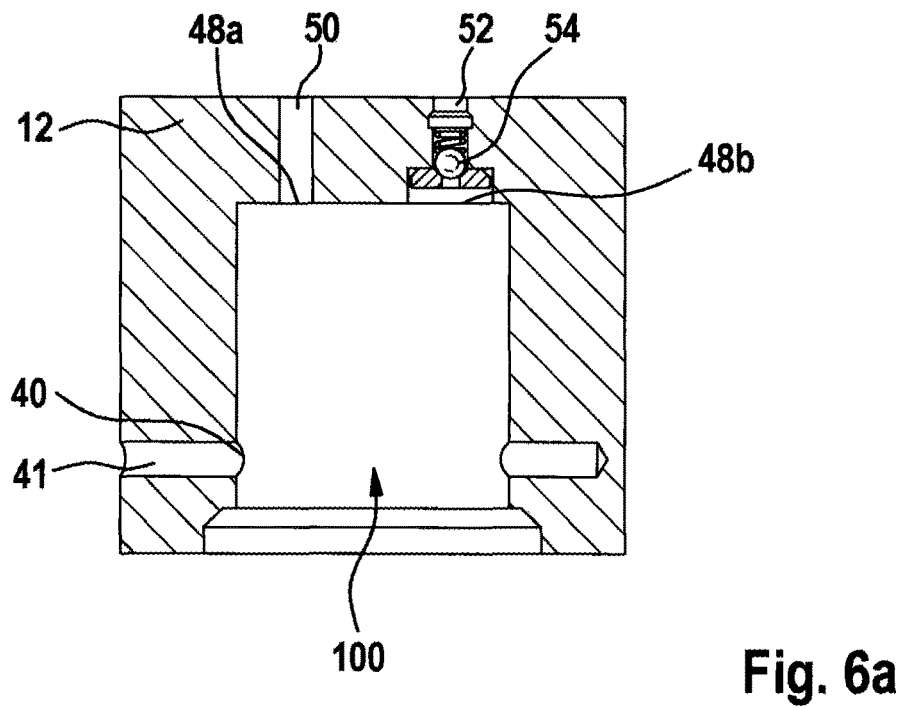
FIGS. 6a through 6e show schematic illustrations for explaining a second specific embodiment of the manufacturing method for a driver brake force simulator for a braking system of a vehicle.
Figure 6B:
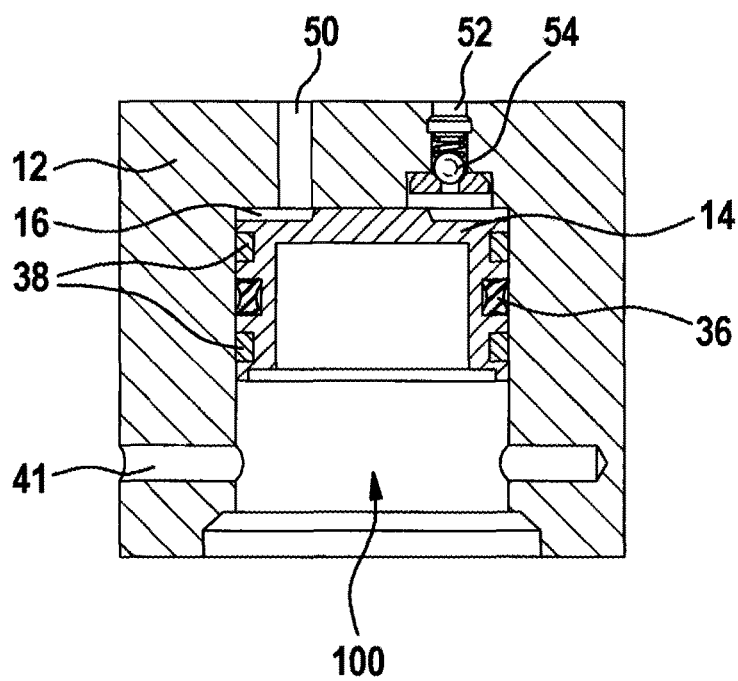

FIG. 6a once again shows hydraulic unit 12 together with borehole 100 formed therein and inserted check valve 54. As illustrated in FIG. 6b, in this manufacturing method as well, displaceable piston 14, together with sealing element 36 which is already fastened thereto and the at least one guide ring 38, is inserted into borehole 100.

Figure 6C:
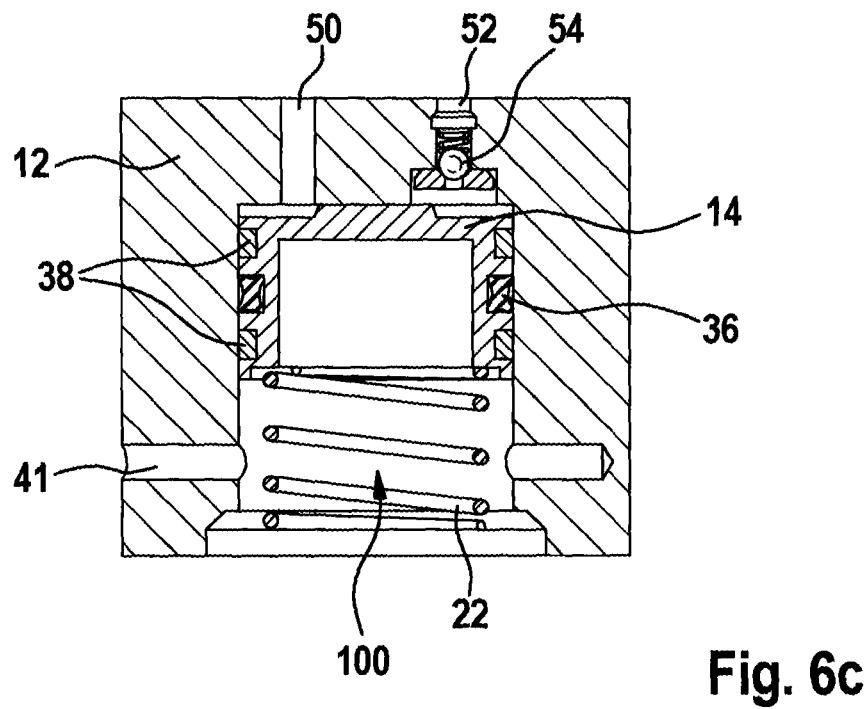
Figure 6D:
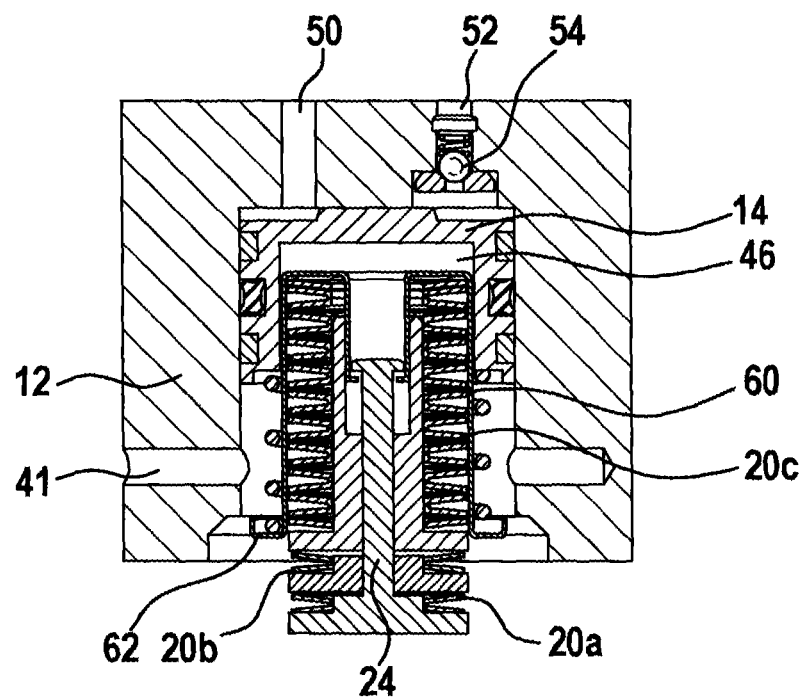

In a method step illustrated in FIG. 6c, coil spring 22 is situated in borehole 100/subsequent spring chamber 34 in such a way that coil spring 22 on a first side contacts displaceable piston 14. A guide plate 60 is subsequently suspended on a second side of coil spring 22 facing away from displaceable piston 14, a flange 62 of guide plate 60 contacting the second side of coil spring 22. Disk springs 20a through 20c fastened to disk spring pin 24 are subsequently inserted into borehole 100 in such a way that a disk spring 20c of disk springs 20a through 20c which is nearest to pressure chamber 16 contacts a base surface of guide plate 60. In this way, at least some of disk springs 20a through 20c are introduced into a volume spanned by the at least one side wall of guide plate 70 (see FIG. 6d). In addition, displaceable piston 14 and disk springs 20a through 20c situated on the at least one disk spring pin 24 are introduced into borehole 100/at least one partial housing 12 of driver brake force simulator 10 in such a way that at least disk spring 20c which is nearest to pressure chamber 16 is introduced into a piston interior of piston 14.

Figure 6E:
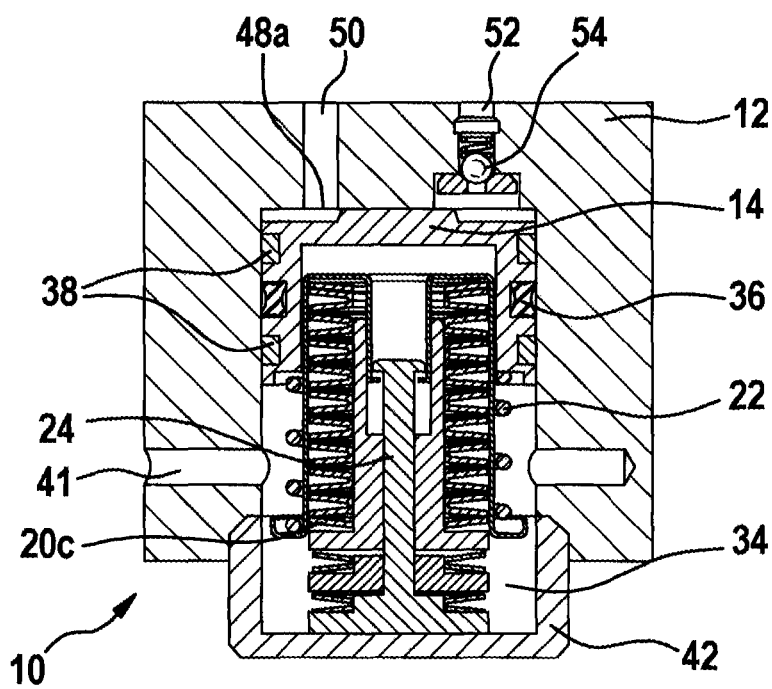

In a concluding method step which is schematically illustrated in FIG. 6e, closure cover 42 is fastened to borehole 100 in such a way that spring chamber 34 formed in this way is closed off in a fluid- and air-tight manner from the outer surroundings of closure cover 42. Coil spring 22 is also pretensioned with the aid of this method step. Closure cover 42 is optionally sealed off from the outside via an O-ring and/or fastened via a snap ring. Alternatively, closure cover 42 may also be screwed on and subsequently metallically sealed.

The above-described manufacturing methods may be carried out cost-effectively. The manufacturing methods may be carried out quickly by using a subassembly in the installation of disk springs 20a through 20c on hydraulic unit 12. A driver brake force simulator 10 manufactured in this way has simple modularity.

What is claimed is:

1. A driver brake force simulator for a braking system of a vehicle, comprising:
   a plurality of disk springs stacked in series with each other, the disk springs including at least one first disk spring having a first spring stiffness characteristic curve and at least one second disk spring having a second spring stiffness characteristic curve that differs from the first spring stiffness characteristic curve, the at least one first disk spring and the at least one second disk spring stacked one on top of another;
   a displaceable piston that delimits a pressure chamber formed in the driver brake force simulator and that is movable from a starting position, against an elastic force of the plurality of disk springs, by a predefined maximum displacement travel in a first direction in such a way that a volume of the pressure chamber which is fillable with brake fluid is increasable; and
   at least one further spring assisting in supporting the displaceable piston, the at least one further spring including at least one coil spring, wherein the plurality of disk springs are situated in an inner volume spanned by the coil spring.

2. The driver brake force simulator as recited in claim 1, further comprising a disk spring pin on which are situated the disk springs in such a way that a center longitudinal axis of the disk spring pin extends centrally through the disk springs.

3. The driver brake force simulator as recited in claim 1, further comprising a disk spring pin on which the plurality of disk springs are stacked.

4. The driver brake force simulator as recited in claim 3, further comprising end components at first and second ends of the disk spring pin to prevent movement of the plurality of disk springs off the disk spring pin.

5. The driver brake force simulator as recited in claim 4, wherein the end components include a disk and a form fit head.

6. The driver brake force simulator as recited in claim 4, further comprising a movable component between the plurality of disk springs and one of the end components, wherein the movable component is configured to move relative to the one of the end components.

7. The driver brake force simulator as recited in claim 6, wherein the movable component is a movable disk.

8. The driver brake force simulator as recited in claim 1, wherein the at least one first disk spring and the at least one second disk spring are directly stacked one on top of another.

9. A driver brake force simulator for a braking system of a vehicle, comprising:
   a plurality of disk springs stacked in series with each other, the disk springs including at least one first disk spring having a first spring stiffness characteristic curve and at least one second disk spring having a second spring stiffness characteristic curve that differs from the first spring stiffness characteristic curve;

a displaceable piston that delimits a pressure chamber formed in the driver brake force simulator and that is movable from a starting position, against an elastic force of the plurality of disk springs, by a predefined maximum displacement travel in a first direction in such a way that a volume of the pressure chamber which is fillable with brake fluid is increasable; and at least one further spring assisting in supporting the displaceable piston in such a way that from the starting position, the displaceable piston, with a deformation of the at least one further spring, is movable by a partial travel of the maximum displacement travel in the first direction, into an intermediate position in which the disk springs are still in starting shapes, wherein the displaceable piston, with a deformation of the disk springs, is subsequently movable by a remaining travel of the maximum displacement travel in the first direction.

10. The driver brake force simulator as recited in claim 9, wherein the at least one further spring includes at least one coil spring.

11. The driver brake force simulator as recited in claim 10, wherein at least some of the disk springs are situated in an inner volume spanned by the coil spring.

12. The driver brake force simulator as recited in claim 11, wherein:
the coil spring is supported on a first side on the displaceable piston, and
the coil spring is supported on an oppositely situated second side on a displaceable disk situated on the disk spring pin.

13. The driver brake force simulator as recited in claim 11, further comprising:
a guide plate having a base surface between the displaceable piston and a disk spring of the disk springs that is nearest to the pressure chamber, wherein:
at least one side wall of the guide plate extends along some of the disk springs,
the coil spring is supported on a first side on the displaceable piston, and
the coil spring is supported on an oppositely situated second side on a flange of the guide plate.

14. The driver brake force simulator as recited in claim 9, further comprising:
a disk spring pin on which the plurality of disk springs are stacked; and
end components at first and second ends of the disk spring pin to prevent movement of the plurality of disk springs off the disk spring pin.

15. The driver brake force simulator as recited in claim 14, further comprising a movable component between the plurality of disk springs and one of the end components, wherein the movable component is configured to move relative to the one of the end components.

16. A braking system for a vehicle, comprising:
at least one driver brake force simulator, including:
a plurality of disk springs stacked in series with each other, the disk springs including at least one first disk spring having a first spring stiffness characteristic curve and at least one second disk spring having a second spring stiffness characteristic curve that differs from the first spring stiffness characteristic curve, the at least one first disk spring and the at least one second disk spring stacked one on top of another;

a displaceable piston that delimits a pressure chamber formed in the driver brake force simulator and that is movable from a starting position, against an elastic force of the plurality of disk springs, by a predefined maximum displacement travel in a first direction in such a way that a volume of the pressure chamber which is fillable with brake fluid is increasable; and at least one further spring assisting in supporting the displaceable piston, the at least one further spring including at least one coil spring, wherein the plurality of disk springs are situated in an inner volume spanned by the coil spring.

17. The braking system as recited in claim 16, wherein the at least one first disk spring and the at least one second disk spring are directly stacked one on top of another.

18. A manufacturing method for a driver brake force simulator for a braking system of a vehicle, comprising:
supporting a displaceable piston of the driver brake force simulator with the aid of a plurality of disk springs, as the result of which a pressure chamber formed in the driver brake force simulator is delimited by the displaceable piston in such a way that during subsequent operation of the driver brake force simulator, a volume of the pressure chamber which is fillable with brake fluid is increased by moving the displaceable piston from a starting position, against an elastic force of the plurality of disk springs, by a predefined maximum displacement travel in a first direction,
wherein the plurality of disk springs are stacked in series with each other, the disk springs including at least one first disk spring having a first spring stiffness characteristic curve and at least one second disk spring having a second spring stiffness characteristic curve that differs from the first spring stiffness characteristic curve, the at least one first disk spring and the at least one second disk spring stacked one on top of another; and
wherein the displaceable piston is also supported by at least one further spring including at least one coil spring, wherein the plurality of disk springs are situated in an inner volume spanned by the coil spring.

19. The method as recited in claim 18, wherein the disk springs are situated on a disk spring pin in such a way that a center longitudinal axis of the disk spring pin extends centrally through the disk springs.

20. The method as recited in claim 19, wherein a disk is pressed onto one end of the disk spring pin bearing the disk springs which faces away from a form-fit head of the disk spring pin in such a way that the disk springs are assembled on a predefined characteristic curve.

21. The method as recited in claim 20, wherein the displaceable piston and the disk springs situated on the at least one disk spring pin are introduced into at least one partial housing of the driver brake force simulator in such a way that at least the disk spring which is nearest to the pressure chamber is introduced into a piston interior of the piston.

22. The method as recited in claim 18, wherein the at least one first disk spring and the at least one second disk spring are directly stacked one on top of another.

23. A manufacturing method for a driver brake force simulator for a braking system of a vehicle, comprising:
supporting a displaceable piston of the driver brake force simulator with the aid of a plurality of disk springs, as the result of which a pressure chamber formed in the driver brake force simulator is delimited by the displaceable piston in such a way that during subsequent operation of the driver brake force simulator, a volume of the pressure chamber which is fillable with brake fluid is increased by moving the displaceable piston from a starting position, against an elastic force of the plurality of disk springs, by a predefined maximum displacement travel in a first direction, wherein the plurality of disk springs are stacked in series with each other, the disk springs including at least one first disk spring having a first spring stiffness characteristic curve and at least one second disk spring having a second spring stiffness characteristic curve that differs from the first spring stiffness characteristic curve, and wherein the displaceable piston is also supported by at least one further spring in such a way that during subsequent operation of the driver brake force simulator, the at least one further spring is deformed during a displacement of displaceable piston from the starting position by a partial travel of the maximum displacement travel in the first direction into an intermediate position, while the disk springs in the intermediate position are still in their starting shapes, and the disk springs are deformed during a subsequent displacement of the displaceable piston by a remaining travel of the maximum displacement travel in the first direction.

24. The method as recited in claim 23, wherein the displaceable piston is supported by at least one coil spring as the at least one further spring.

\* \* \* \* \*